United States Patent [19]
Yukio

[11] 4,255,020
[45] Mar. 10, 1981

[54] ZOOM LENS SYSTEM CAPABLE OF MACROPHOTOGRAPHY

[75] Inventor: Katahira Yukio, Sayama, Japan

[73] Assignee: Osawa Precision Industries, Ltd., Tokyo, Japan

[21] Appl. No.: 54,505

[22] Filed: Jul. 3, 1979

[30] Foreign Application Priority Data

Jul. 3, 1978 [JP] Japan ................. 53-080678

[51] Int. Cl.³ .............................................. G02B 7/10
[52] U.S. Cl. ................................................ 350/430
[58] Field of Search ................................... 350/187

[56] References Cited

U.S. PATENT DOCUMENTS

| | | | |
|---|---|---|---|
| 3,277,783 | 10/1966 | Eggert | 350/187 |
| 3,465,662 | 9/1969 | Kashiwase | 350/187 |
| 3,506,338 | 4/1970 | Holderbaum | 350/187 |
| 3,582,188 | 6/1971 | Rau | 350/187 |
| 3,891,310 | 6/1975 | Hideo | 350/187 |

*Primary Examiner*—Conrad J. Clark
*Attorney, Agent, or Firm*—Robert E. Wagner; Ralph R. Rath

[57] ABSTRACT

The optical system includes a variator lens and a compensator lens each adapted for cammed axial movement along the optical axis in response to rotation of a cam tube for varying the focal length of the system in a normal zoom range between a telephoto condition and a wide-angle condition. A control member is coupled to the cam tube and is shiftable between a normal range condition for preventing axial movement of the cam tube during focusing in the normal zoom range and a macrophotographic range condition which effects a cammed axial movement of the cam tube in response to rotation thereof for focusing the system in a macrophotographic range. Radially shiftable and axially shiftable control mechanisms are disclosed.

25 Claims, 7 Drawing Figures

ZOOM LENS SYSTEM CAPABLE OF MACROPHOTOGRAPHY

BACKGROUND OF THE INVENTION

This invention relates to a variable focal length optical system which is focusable in a normal range and in a closeup range. More specifically, the present invention relates to a zoom lens system which is capable of macrophotography.

The typical zoom lens system has a variator lens and a compensator lens, each of which is disposed in camming engagement with a cam tube which is rotatable for mutually simultaneously effecting cammed axial movements of the variator and compensator lenses for focusing the system in a normal zoom range between a telephoto condition and a wide-angle condition. In order to make macrophotography possible in such a zoom lens system, provision is typically made at one and/or both ends of the normal zoom range for holding either the variator lens or the compensator lens stationary while moving only the other one for focusing in a macrophotographic range.

In one form of zoom lens system, this selective control of the variator and compensator lenses is accomplished by splitting the cam tube into two parts, respectively for controlling the variator lens and the compensator lens. When the system is operated in the normal zoom range, the two parts of the cam tube are rotated together, and when macrophotography is to be effected, the two cam tubes are de-coupled from each other so as to be operable independently of each other. In such a system, since the cam tube is separated into two portions, the moving range of each lens is limited to the length of the corresponding portion of the cam tube.

In other zoom lens systems, this problem is avoided by forming the macrophotography cam slots as continuous extensions of the normal zoom range cam slots in a unitary cam tube. Such an arrangement is disclosed in the copending application of Rudolph Hartmann, Ser. No. 744,835, filed Nov. 24, 1976, now abandoned and assigned to the assignee of the present invention. By such an arrangement, the moving range of each of the variator and compensator lenses can be spread wider than in the case of a split cam tube, but the increased length of the cam slots tends to weaken the cam tube.

Still another arrangement is disclosed in U.S. Pat. No. 3,891,310, wherein the cam tube is stationary, the cam pins for the variator lens and compensator lens extending completely through the corresponding cam slots in the stationary cam tube for engagement with a rotatable outer operating sleeve. The operating sleeve has a normal position wherein it engages the cam pins of both lenses for operation in the normal zoom range, and a retracted position wherein it engages only one of the lens cam pins for operation in a macrophotographic range. But this arrangement necessitates the use of an additional operating sleeve, and it also has the disadvantage of causing rotation of the variator and compensator lenses as they are moved axially by the action of the cam slots. Furthermore, since the cam slot used for controlling the movement of the variator lens in the macrophotographic range is the same as that used for controlling that lens during the normal zone range, the configuration of that cam slot limits the movement which the variator lens can undergo in the macrophotographic range. This is a major limitation since, in most macrophotographic applications, it is desirable to move one or the other of the variator lens and the compensator lens in a manner different from its movement during the normal zoom range operation and, indeed, it is typically desirable that either the variator lens or the compensator lens be held stationary in the macrophotographic range.

SUMMARY OF THE INVENTION

The present invention relates to an improved zoom lens system with macrophotographic capability, which avoids the disadvantages of prior art systems.

It is a general object of this invention to provide a zoom lens system which has macrophotographic capability, and which permits the use of a unitary cam tube without extending the length of the normal zoom range cam slots therein.

It is another object of this invention to provide a zoom lens system of the type set forth which permits movement of the variator lens and/or the compensator lens during macrophotographic operation through a range of movement which is different from their range of movement during normal zoom operation.

In connection with the foregoing object, it is another object of this invention to provide a zoom lens system of the type set forth wherein the movement of the variator and compensator lenses in the macrophotographic range are controlled by effecting simultaneous axial and rotational movement of the cam tube.

In summary, there is provided in a variable focal length optical system having an optical axis and including a cam tube disposed in camming engagement with lens operating means which is coupled to a variator lens and a compensator lens for accommodating mutual axial movements thereof, wherein one of the cam tube and the lens operating means is rotatable with respect to the optical axis for effecting coordinated cammed axial movements of the variator lens and the compensator lens with respect to the cam tube for zooming in a normal range between a telephoto condition and wide-angle condition, the improvement for focusing in a macrophotographic range comprising control means coupled to the cam tube and shiftable between a normal range condition and a macrophotographic range condition, the control means in the normal range condition thereof preventing axial movement of the cam tube for focusing of the optical system in the normal range, the control means in the macrophotographic range condition thereof effecting axial movement of the cam tube in response to rotational movement of the rotatable one of the cam tube and the lens operating means thereby to alter the axial movement of the variator lens and the compensator lens for effecting focusing of the optical system in the macrophotographic range.

The invention consists of certain novel features in the combination of parts hereinafter fully described, illustrated in the accompanying drawings, and particularly pointed out in the appended claims, it being understood that various changes in the details may be made without departing from the spirit, or sacrificing any of the advantages of the invention.

DESCRIPTION OF THE PREFERRED EMBODIMENTS

Figure 1:
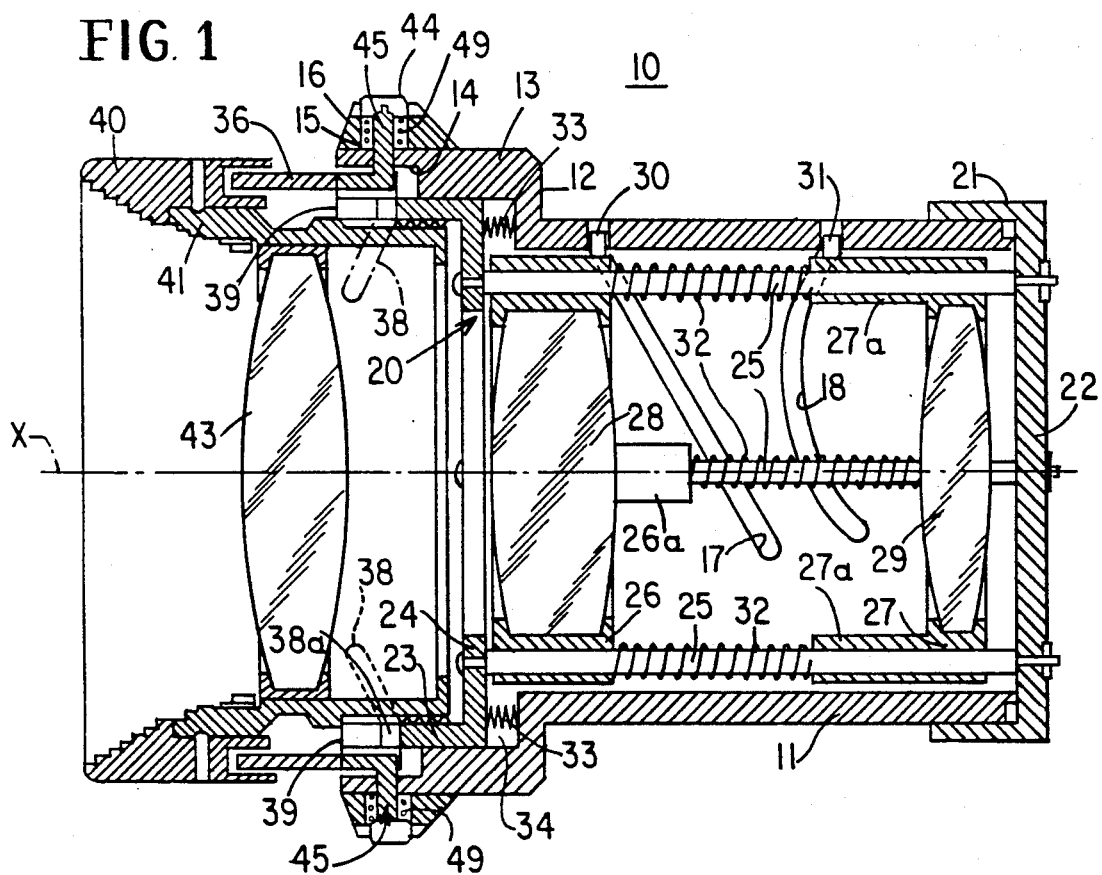
FIG. 1 is a view in vertical section of a zoom lens system constructed in accordance with and embodying the features of a first embodiment of the present invention, with the parts illustrated in their position for normal zoom lens operation.
Figure 2:
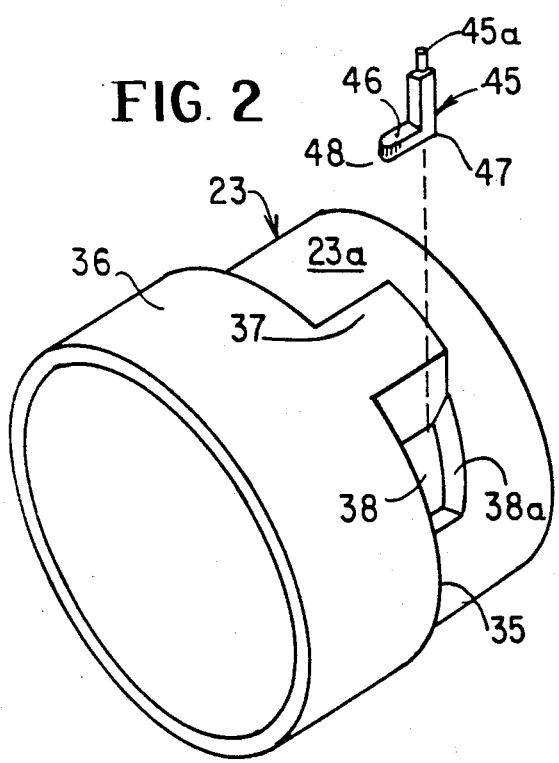
FIG. 2 is a perspective exploded view of the portion of the system of FIG. 1 utilized for controlling macrophotography.
Figure 3:
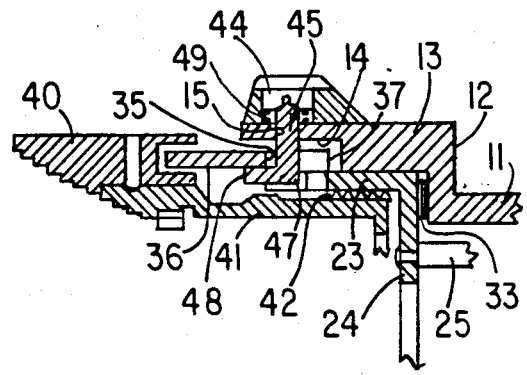
FIG. 3 is a fragmentary view in vertical section of the portion of FIG. 1 used for controlling macrophotography, with the parts illustrated in the macrophotography position.

Referring to FIGS. 1 through 3 of the drawings, there is illustrated a zoom lens assembly, generally designated by the numeral 10, which includes a cylindrical cam tube 11 mounted coaxially with and for rotation with respect to the optical axis X of the lens assembly 10. The cam tube 11 is provided at the forward end thereof with a radially outwardly extending annular flange 12, which is in turn provided at the outer edge thereof with a forwardly extending large-diameter cylindrical portion 13. The forward end of the large-diameter portion 13 is provided with a recess 14 in the inner surface thereof extending circumferentially therearound. Extending radially through this recessed outer end of the large-diameter portion 13 are two diametrically opposed openings 15, being respectively surrounded at the outer edges thereof by bosses 16 which project radially outwardly therefrom. Formed in the inner surface of the cam tube 11 are two elongated cam grooves 17 and 18.

Disposed coaxially with the cam tube 11 is an operating tube assembly, generally designated by the numeral 20, which is fixed with respect to the associated camera housing (not shown) and which includes a cylindrical rear tube 21 disposed in telescoping surrounding relationship with the rear end of the cam tube 11 and closed at the rear end thereof by a circular end wall 22. The operating tube assembly 20 also includes a front tube 23 disposed within the large-diameter portion 13 of the cam tube 11 and provided at the rear edge thereof with a radially inwardly extending annular flange 24. Interconnecting the end wall 22 of the rear tube 21 and the annular flange 24 of the front tube 23 are a plurality of equiangularly spaced-apart tie rods 25 which maintain the front and rear tubes 23 and 21 fixed with respect to each other and spaced apart a predetermined distance.

The tie rods 25 are received through complementary openings in two cylindrical lens holders 26 and 27 which are disposed within the cam tube 11 coaxially therewith and are adapted for sliding axial movements along the tie rods 25. To facilitate sliding movement along the tie rods 25 and to minimize wobbling thereon, the lens holders 26 and 27 are respectively provided with tubular extensions 26a and 27a surrounding alternate ones of the tie rods 25, with the tubular extensions 26a of the lens holder 26 being disposed in staggered relationship with the tubular extensions 27a of the lens holder 27 to avoid interference with each other as the lens holders 26 and 27 slide axially along the tie rods 25. While four of the tie rods 25 have been shown in FIG. 1 for purposes of illustration, it will be understood that a different number of tie rods could be used, as long as the tubular extensions 26a and 27a are arranged to avoid interference with each other. Respectively mounted in the lens holders 26 and 27 are a variator lens 28 and a compensator lens 29 arranged coaxially with the optical axis X. The lens holders 26 and 27 are respectively provided with radially outwardly extending cam pins 30 and 31 which are respectively disposed in camming engagement in the cam grooves 17 and 18 of the cam tube 11.

It will be appreciated that, since the operating tube assembly 20 is fixed, rotation of the cam tube 11 will effect a cammed axial movement of the variator lens 28 and the compensator lens 29 along the tie rods 25 axially of the lens assembly 10, the tie rods 25 serving to prevent rotational movement of the lenses 28 and 29, all in a well-known manner. Preferably, helical compression springs 32 are respectively disposed in surrounding relationship with the tie rods 25 between the lens holders 26 and 27 for resiliently urging the lens holders 26 and 27 apart. There are also provided a plurality of compression springs 33 between the annular flange 12 of the cam tube 11 and the annular flange 24 of the front tube 23 for resiliently urging these members apart to define therebetween an annular gap 34.

The front tube 23 is provided at the forward edge thereof with a radially outwardly extending annular step portion 35, which is in turn integral at the outer edge thereof with a forwardly extending large-diameter cylindrical portion 36. Integral with the step portion 35 at spaced-apart points thereon and extending rearwardly therefrom along the outer surface 23a of the front tube 23 are two stop members 37. Formed in the front tube 23 adjacent to the step portion 35 are two cam slots 38 which respectively extend a predetermined circumferential distance from the stop members 37 and define two cam surfaces 38a. Arcuate slots or apertures 39 are formed in the step portion 35 of the front tube 23 respectively opposite the cam surfaces 38a. The outer surface 23a of the front tube 23 is disposed just inside the inner surface of the large-diameter portion 13 of the cam tube 11, with the stop members 37 being accommodated in the annular recess 14.

Disposed forwardly of the operating tube assembly 20 is a focus ring 40 which is fixedly secured around the forward end of a cylindrical focus lens holder 41, the rear end of which is received coaxially within and threadedly engaged with the front tube 23 of the operating tube assembly 20, as at 42. Fixedly mounted in the focus lens holder 41 is a focus lens 43, it being appreciated that focusing is accomplished by rotation of the focus ring 40.

Respectively extending through the openings 15 and the bosses 16 of the large-diameter portion 13 of the cam tube 11 are two control plungers 45, each provided at the inner end thereof with a forwardly projecting control foot 46. The outer end of each of the control plungers 46 is provided with an attachment pin 45a fixedly secured to a cap or button 44 which is trapped in the outer end of the associated boss 16 and projects a predetermined distance outwardly therefrom. Respectively disposed in the two bosses 16 in surrounding relationship with the control plungers 45 are two helical compression springs 49, which serve resiliently to urge the control plungers 45 radially outwardly to a normal range condition illustrated in FIG. 1. Each control foot 46 has a heel portion 47 at the rear end thereof which, in the normal range condition, is disposed radially outwardly of the outer surface 23a of the front tube 23. Each control foot 46 is also provided at the forward end thereof with a toe portion 48 which is disposed in contact with the step portion 35 of the front tube 23 when the control plunger 45 is disposed in its normal range condition.

Each of the control plungers 45 is manually depressable, against the urging of the associated bias spring 49, to a macrophotographic range condition, illustrated in FIG. 3, wherein the heel portion 47 of the control foot 46 is disposed in the associated cam slot 38 for camming engagement with the cam surface 38a, and the toe portion 48 is disposed opposite the associated slot 39 in the step portion 35 of the front tube 23 so as to be cammingly movable through the slot 39 and inside the large-diameter portion 36 of the front tube 23, as illustrated in FIG. 3.

Figure 4:
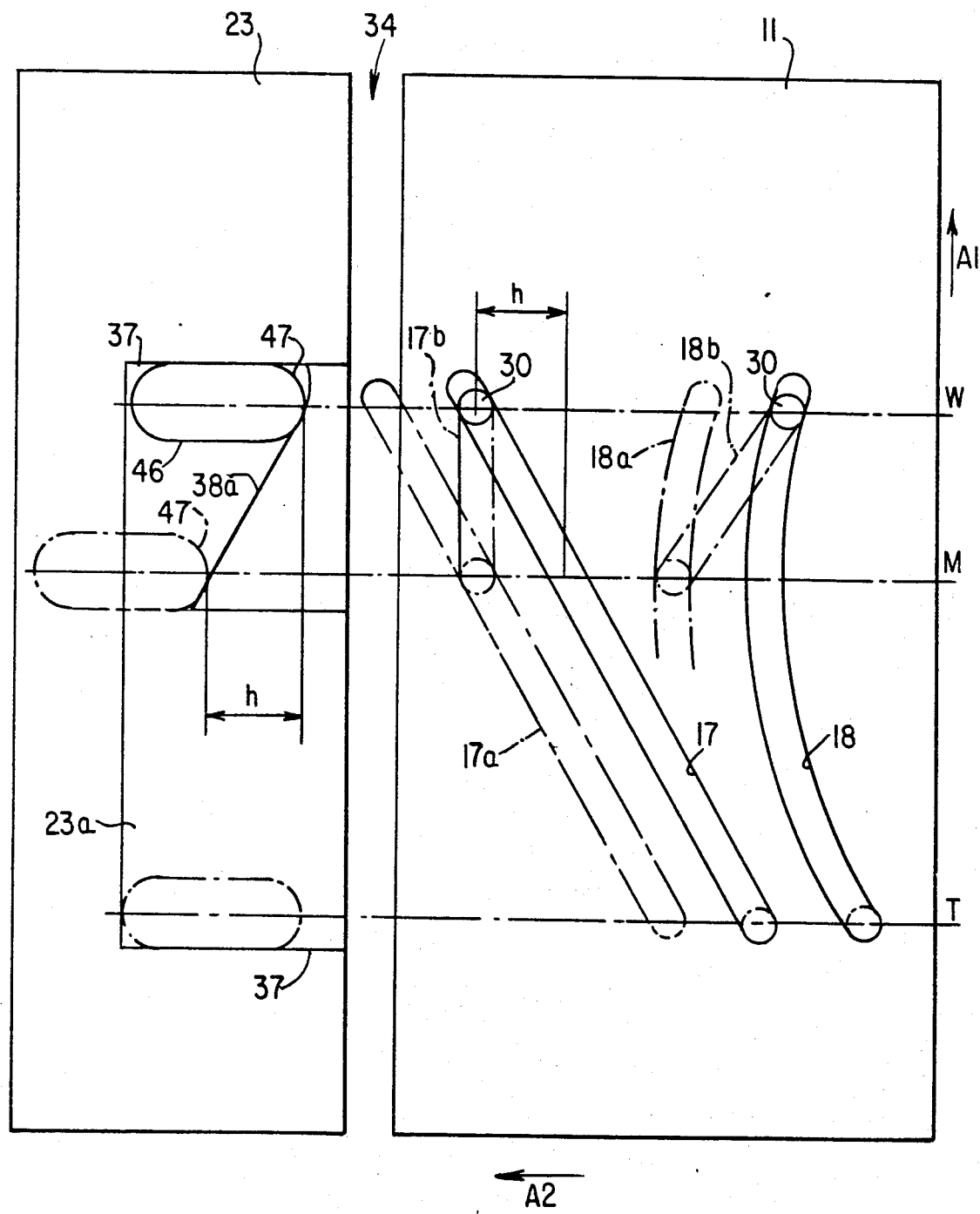
FIG. 4 is a developed view of the camming means of the apparatus of FIG. 1, illustrating operation in the normal zoom range and in a macrophotographic range.

Referring now also to FIG. 4 of the drawings, the operation of the zoom lens assembly 10 will be described. When the zoom lens assembly 10 is disposed in the normal range condition illustrated in FIG. 1, it can be operated in the normal zoom range by rotation of the cam tube 11. The cam tube 11 is prevented from axial movement by the end wall 22 of the rear tube 21 and by engagement of the toe portions 48 of the control plunger feet 46 with the step portion 35 of the front tube 23. The zoom lens assembly 10 is illustrated in FIGS. 1 and 4 at the wide-angle end of the normal zoom range, designated in FIG. 4 by the letter W. As the cam tube 11 is rotated in the direction indicated by the arrow A1 in FIG. 4 (counterclockwise), as viewed from the right-hand end thereof in FIG. 1) the cam pins 30 and 31 are prevented from rotation by the tie rods 25, but the camming action of the cam grooves 17 and 18 effects axial movements of the cam pins 30 and 31 and corresponding axial movements of the variator and compensator lenses 28 and 29.

Referring to FIG. 4, if the cam tube 11 is considered as being stationary and the operating tube assembly 20 rotatable, then the cam pins 30 and 31 may be considered as moving along the cam grooves 17 and 18 from the wide-angle position W toward the telephoto position, designated T. It will be appreciated that the cam grooves 17 and 18 are so designed that as the cam tube 11 is rotated, the variator and compensator lenses 28 and 29 undergo mutual axial movements which are coordinated for varying the focal length while at the same time effecting compensation for the deviation of the focusing point in a normal zoom operation. During this rotation of the cam tube 11 in a normal zoom operation, the control plungers 45 rotate with the cam tube 11 along the outer surface 23a of the front tube 23 of the operating tube assembly 20, the control plungers 45 being respectively engageable with the stop members 37 for limiting rotation of the cam tube 11 at the wide-angle and telephoto ends of the zoom focusing range.

For macrophotography, the cam tube 11 is rotated back to the wide-angle end W of its normal focusing range and the control plungers 45 are simultaneously depressed into the cam slots 38. With the control plungers 45 held depressed, the cam tube 11 is again rotated toward the telephoto end T of the normal zoom range. This rotation brings the heel portions 47 of the control plunger feet 46 into camming engagement with the cam surfaces 38a, for axially moving the control plungers 45 and, thereby, the cam tube 11 forwardly along the optical axis X, in the direction of the arrow A2 in FIG. 4, this axial movement being accommodated by compression of the springs 33 for closing the gap 34 and by sliding of the toe portions 48 of the control feet 46 into the slots 39 in the step portion 35 of the front tube 23. This axial movement of the cam tube 11 effects a shifting of the cam grooves 17 and 18 to the positions 17a and 18a indicated in broken line in FIG. 4.

Since, simultaneously with this axial shifting of the cam tube 11, the cam pins 30 and 31 are also moving relative to the cam grooves 17 and 18 in response to the rotation of the cam tube 11, it will be appreciated that the cam pins 30 and 31 undergo a resultant compound movement which is represented by the loci 17b and 18b in FIG. 4. The rotation of the cam tube 11 is limited by the engagement of the control plungers 45 with the ends of the cam slots 38 at the end of the macrophotographic range, designated by the letter M in FIG. 4. Preferably, the cam surfaces 38a are so designed that the length of axial movement imparted thereby to the cam tube 11, designated "h" in FIG. 4, is exactly equal in magnitude and opposite in direction to the axial movement which is imparted to the variator lens cam pin 30 by rotation of the cam tube 11. Thus, the variator lens 28 remains stationary along the optical axis during the macrophotographic focusing operation, as can be seen from the locus 4b in FIG. 4. It will, of course, be appreciated that the cam surfaces 38a could be arranged so that only the variator lens 28 is movable, while the compensator lens 29 is maintained stationary during the macrophotographic focusing operation.

Figure 5:
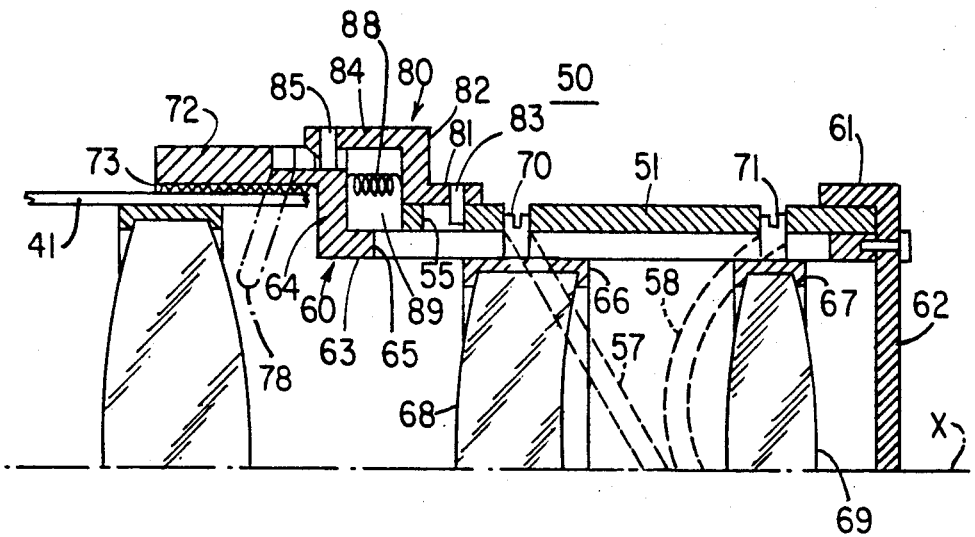
FIG. 5 is a partial view in vertical section, similar to that in FIG. 1, showing a zoom lens system constructed in accordance with and embodying the features of a second embodiment of the present invention.
Figure 6:
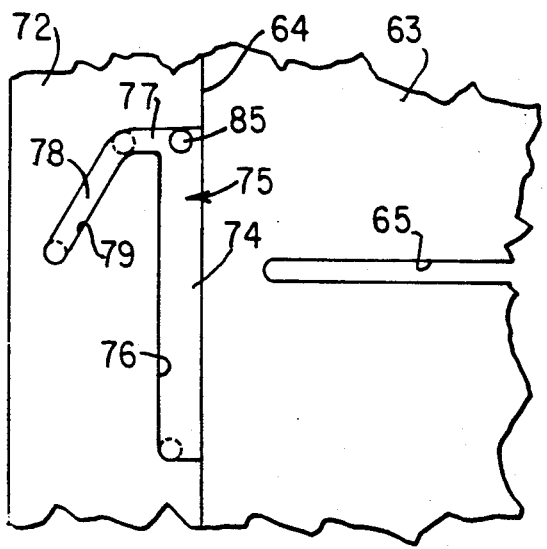
FIG. 6 is an enlarged fragmentary top plan view of the lens operating tube of the system of FIG. 5, illustrating the macrophotographic cam means.

Referring now to FIGS. 5 and 6 of the drawings, there is illustrated another embodiment of the zoom lens assembly of the present invention, generally designated by the numeral 50. The zoom lens assembly 50 includes a cylindrical cam tube 51 which is disposed coaxially with the optical axis X of the zoom lens assembly and is mounted so as to be rotatable with respect thereto. Formed in the outer surface of the cam tube 51 adjacent to the front end thereof is a short axial slot 55, the cam tube 51 also being provided with two elongated cam slots 57 and 58 therethrough.

Disposed coaxially with the cam tube 51 is a fixed operating tube assembly, generally designated by the numeral 60, which includes a cylindrical rear tube 61 disposed in surrounding relationship with the rear end of the cam tube 51 and closed at the rear edge thereof by a circular end wall 62. The operating tube assembly 60 also includes a cylindrical inner tube 63 disposed within the cam tube 51 and secured to the end wall 62 of the rear tube 61. The inner tube 63 is provided at its forward edge forwardly of the cam tube 51 with an integral radially outwardly extending annular flange 64. Formed in the inner tube 63 is an elongated axial groove 65. Disposed within the inner tube 63 are two cylindrical lens holders 66 and 67, in which are respectively fixedly mounted a variator lens 68 and a compensator lens 69. The lens holders 66 and 67 are respectively provided with radially outwardly extending cam pins 70 and 71 which extend outwardly through the elongated axial groove 65 and respectively engage in the cam slots 57 and 58.

Integral with the annular flange 64 at the outer edge thereof and projecting forwardly therefrom is a large-diameter cylindrical portion 72, the inner surface of which is threadedly engaged with a focus lens holder, which is illustrated in simplified form in FIG. 5, but may be identical to the focus lens holder 41, described above in connection with FIG. 1. Formed in the outer surface of the large-diameter cylindrical portion 72 is a groove or recess, generally designated by the numeral 75, which includes a straight circumferential portion 74 disposed at the rear edge of the large-diameter portion 72 and defining a stop surface 76 along the front edge thereof. The portion 74 communicates at one end thereof with a short axial transition portion 77 which extends forwardly from the circumferential portion 74 and, in turn, joins one end of an angled cam portion 78 which defines a cam surface 79.

Disposed adjacent to the forward end of the cam tube 51 is a control sleeve, generally designated by the numeral 80, which includes an inner cylindrical portion 81 disposed in surrounding relationship with the forward end of the cam tube 51, and integral at the forward edge thereof with a radially outwardly extending annular step portion 82. Fixedly secured to the inner cylindrical portion 81 and extending radially inwardly therefrom into the axial slot 55 in the cam tube 51 is a pin 83. The step portion 82 is integral at its outer edge thereof with a forwardly extending outer cylindrical portion 84, to which is fixedly secured a radially inwardly extending pin 85 which extends into the groove 75 in the inner tube 63. One or more compression springs 88 are disposed between the step portion 82 of the control sleeve 80 and the annular flange 64 of the inner tube 63 for urging these members resiliently apart to define therebetween a gap 89.

In operation, when the zoom lens assembly 50 is in the normal range condition illustrated in FIG. 5, the pin 83 is held against the rear end of the slot 55 and the pin 85 is held in the circumferential portion 74 of the groove 75 by the operation of the springs 88. When the cam tube 51 is rotated, the camming action of the cam slots 57 and 58 on the cam pins 70 and 71 effects mutual and coordinated axial movements of the variator lens 68 and the compensator lens 69, these axial movements being accommodated by the axial groove 65 in the cam tube 51, which groove also serves to prevent rotational movement of the variator and compensator lenses 68 and 69. The rotation of the cam tube 51 effects a corresponding rotation of the control sleeve 80 through the action of the slot 55 against the pin 83, this rotation of the control sleeve 80 being permitted by the fact that the pin 85 is held in the circumferential portion 74 of the groove 75 by the spring 88. It will also be appreciated that axial movement of the control sleeve 80 during rotation thereof is prevented by the rear tube end wall 62 and the engagement of the pin 83 with the stop surface 76 of the groove 75. The rotation of the cam tube 51 is limited by the engagement of the pin 85 with the opposite ends of the circumferential portion 74 of the groove 75, the upper end, as viewed in FIG. 6, corresponding to the wide-angle end of the normal zoom range and the lower end corresponding with the telephoto end of the normal zoom range.

When it is desired to operate the zoom lens assembly 50 in the macrophotographic range, the cam tube 51 is first rotated back to the wide-angle end of the normal zoom range. Then the control sleeve 80 is pushed forwardly against the urging of the bias spring 88 to a macrophotographic range condition, wherein the pin 85 is disposed at one end of the cam portion 78 of the groove 75, this axial shifting of the control sleeve 80 being accommodated by the transition portion 77 of the groove 75 and the slot 55 in the cam tube 51. With the control sleeve 80 held forward in this macrophotographic condition, it is rotated in a direction toward the telephoto end of the normal zoom range, thereby effecting a corresponding rotation of the cam tube 51 through the operation of the pin 83.

This rotation also brings the pin 85 into engagement with the cam surface 79 of the groove 75 for effecting a cammed axial movement of the control sleeve 80 forwardly, or to the left, as viewed in FIG. 6. Since the pin 83 is disposed to the forward end of the slot 55, this axial movement of the control sleeve 80 causes a corresponding axial movement of the cam tube 51, thereby shifting the positions of the cam slots 57 and 58. Thus, the axial movement of the variator and compensator lenses 68 and 69 is imparted partially by the axial movement of the cam tube 51 and partially by the rotational movement of the cam tube 51 through the cooperation of the cam pins 70 and 71 in the cam slots 57 and 58, in the same manner as was described above in connection with the embodiment of FIG. 1. The rotation of the control sleeve 80 and the cam tube 51 in the macrophotographic range is limited by the engagement of the pin 85 in the end of the cam portion 78 of the groove 75.

Figure 7:
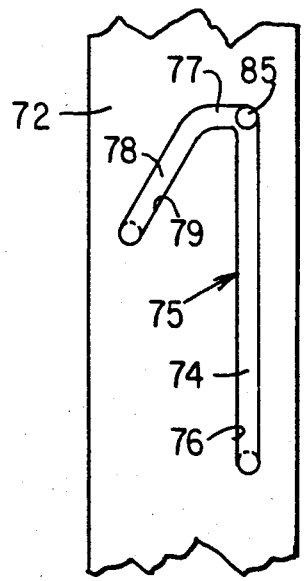
FIG. 7 is a view similar to FIG. 6 of an alternate form of macrophotographic cam means for use in the system of FIG. 5.

In FIG. 7, there is illustrated an alternative form of the groove 75 of FIG. 6, wherein the circumferential portion 74 is spaced a predetermined distance from the rear edge of the large-diameter cylindrical portion 72 of the inner tube 63. Otherwise, the embodiment of FIG. 7 operates in exactly the same manner as was just described with respect to FIGS. 5 and 6.

It is an important advantage of the present invention that both the zoom lens assemblies 10 and 50 can be operated in either the normal zoom range or in the macrophotographic range by a single manual operation, without having to move the hand from one part of the mechanism to the other. Thus, in the zoom lens assembly 10, the plungers 45 can be held depressed simultaneously with rotation of the cam tube 11 by one hand and, in the zoom lens assembly 50, the control sleeve 80 can be axially shifted between its normal and macrophotographic range conditions with the same hand as is used for rotating the cam tube 51, all without removing the hand from the plungers 45 or the control sleeve 80. By providing an arrangement which permits combined axial and rotational movements of the cam tube in the macrophotographic range of operation, the present invention permits the variator and compensator lenses to be moved differently in the macrophotographic range than they are moved in the normal zoom range, all without increasing the length of the cam grooves on the cam tube.

While there have been described what are at present considered to be the preferred embodiments of the invention, it will be understood that various modifications may be made therein. For example, while the present invention has been disclosed with rotatable cam tubes and fixed operating tube assemblies, it will be appreciated that it would also be possible to construct the systems with the cam tubes non-rotatable and with the operating tube assemblies rotatable. Also, it will be appreciated that the cam grooves for the variator and compensator lenses could be formed on the operating tube assembly, with the cam pins formed on the cam tube, instead of vice versa. Similarly, the cam slots for macrophotography could be formed on the cam tube with the cooperating pins formed on the operating tube assembly. Furthermore, while in the preferred embodiments the cam groove for macrophotography has been positioned for performing macrophotography at the wide-angle end of the normal zoom range, it will be appreciated that the parts could be arranged instead for performance of macrophotography at the telephoto end of the normal zoom range or at some region between the wide-angle and telephoto ends of the normal zoom range. It will also be appreciated that the zoom lens assembly 10 could be provided with a single control plunger, macrophotographic cam slot and stop member, but smoother operation is obtained by the use of two of each of these members as described in the preferred embodiment.

What is claimed is:

1. In a variable focal length optical system having an optical axis and including a cam tube disposed in camming engagement with lens operating means which is coupled to a variator lens and a compensator lens for accommodating mutual axial movements thereof, wherein one of the cam tube and the lens operating means is rotatable with respect to the optical axis for effecting coordinated cammed axial movements of the variator lens and the compensator lens with respect to the cam tube for focusing in a normal range between a telephoto condition and a wide angle condition, the improvement for focusing in a macrophotographic range comprising control means coupled to the cam tube and shiftable between a normal range condition and a macrophotographic range condition, said control means in the normal range condition thereof preventing axial movement of the cam tube for focusing of the optical system in the normal range, said control means in the macrophotographic range condition thereof effecting axial movement of the cam tube in response to rotational movement of the rotatable one of the cam tube and the lens operating means thereby to alter the axial movement of the variator lens and the compensator lens for effecting focusing of the optical system in the macrophotographic range.

2. The optical system of claim 1, wherein said control means includes camming means operable in the macrophotographic range condition for effecting cammed axial movement of the cam tube.

3. The optical system of claim 1, wherein said control means effects axial movement of the cam tube between a normal range position and a macrophotographic position, and further including bias means resiliently urging the cam tube to the normal range position thereof.

4. The optical system of claim 1, wherein said control means is shiftable from the normal range condition to the macrophotographic range condition thereof when said optical system is in the wide angle condition thereof.

5. The optical system of claim 1, wherein the variator lens is maintained axially stationary when said control means is in the macrophotographic range condition thereof.

6. The optical system of claim 1, wherein the cam tube is rotatable with respect to the optical axis.

7. The optical system of claim 1, and further including bias means resiliently urging said control means to the normal range condition thereof.

8. In a variable focal length optical system having an optical axis and including a cam tube disposed in camming engagement with lens operating means which is coupled to a variator lens and a compensator lens for accommodating mutual axial movements thereof, wherein one of the cam tube and the lens operating means is rotatable with respect to the optical axis for effecting coordinated cammed axial movements of the variator lens and the compensator lens with respect to the cam tube for focusing in a normal range between a telephoto condition and a wide angle condition, the improvement for focusing in a macrophotographic range comprising a fixed macrophotographic cam member, a control member coupled to the cam tube and having a cam follower thereon, said control member being shiftable with respect to the cam tube between a normal range condition and macrophotographic range condition, and fixed stop means engageable with said control member in the normal range condition thereof to prevent axial movement of the cam tube for focusing of the optical system in the normal range, said cam follower being disposed in camming engagement with said cam member in the macrophotographic range condition of said control member for effecting cammed axial movement of the cam tube in response to rotational movement of the rotatable one of the cam tube and the lens operating means thereby to alter the axial movement of the variator lens and the compensator lens for effecting focusing of the optical system in the macrophotographic range.

9. The optical system of claim 8, wherein said macrophotographic cam member is integral with the lens operating means.

10. The optical system of claim 8, wherein said control member is radially shiftable with respect to the cam tube between the normal range and macrophotographic range conditions.

11. The optical system of claim 8, wherein said control member is axially shiftable with respect to the cam tube between the normal range and macrophotographic range conditions.

12. The optical system of claim 8, wherein said stop means is integral with the lens operating means.

13. The optical system of claim 8, wherein the cam tube is rotatable with respect to the optical axis, the lens operating means being disposed coaxially within the cam tube.

14. In a variable focal length optical system having an optical axis and including a cam tube disposed in camming engagement with lens operating means which is coupled to a variator lens and a compensator lens for accommodating mutual axial movements thereof, wherein one of the cam tube and the lens operating means is rotatable with respect to the optical axis for effecting coordinated cammed axial movements of the variator lens and the compensator lens with respect to the cam tube for focusing in a normal range between a telephoto condition and a wide angle condition, the improvement for focusing in a macrophotographic range comprising a generally cylindrical macrophotographic cam member disposed coaxially with the optical axis and fixed with respect thereto, said cam member having thereon a stop surface and a cam surface displaced radially from each other, a control plunger coupled to the cam tube and shiftable radially with respect thereto between a normal range condition and a macrophotographic range condition, said control plunger in the normal range condition thereof being engageable with said stop surface to prevent axial movement of the cam tube for focusing of the optical system in the normal range, said control plunger in the macrophotographic range condition thereof being disposed out of engagement with said stop surface and disposed for camming engagement with said cam surface for effecting cammed axial movement of the cam tube in response to rotational movement of the rotatable one of the cam tube and the lens operating means thereby to alter the axial movement of the variator lens and the compensator lens for effecting focusing of the optical system in the macrophotographic range.

15. The optical system of claim 14, wherein the cam tube is axially movable between a normal range position and a macrophotographic position, and further including first bias means resiliently urging the cam tube toward the normal range position thereof, and second bias means resiliently urging said control plunger toward the normal range condition thereof.

16. The optical system of claim 14, wherein said cam surface is disposed radially inwardly of said stop surface.

17. The optical system of claim 14, wherein said cam member includes a first relatively large diameter cylindrical portion having said stop surface thereon and a second relatively small diameter cylindrical portion and an annular web radially interconnecting said first and second cylindrical portions, said second cylindrical portion having a recess in the outer surface thereof defining said cam surface, and said annular web having an arcuate slot therein for accommodating cammed movement of said control plunger in the macrophotographic range condition thereof.

18. In a variable focal length optical system having an optical axis and including a cam tube disposed in camming engagement with lens operating means which is coupled to a variator lens and a compensator lens for accommodating mutual axial movements thereof, wherein one of the cam tube and the lens operating means is rotatable with respect to the optical axis for effecting coordinated cammed axial movements of the variator lens and the compensator lens with respect to the cam tube for focusing in a normal range between a telephoto condition and a wide angle condition, the improvement for focusing in a macrophotographic range comprising a generally cylindrical macrophotographic cam member disposed coaxially with the optical axis and fixed with respect thereto, said cam member having thereon a stop surface and a cam surface displaced from each other axially relative to the optical axis, a control sleeve disposed coaxially with the cam tube and coupled thereto and being shiftable axially with respect thereto between a normal range condition and a macrophotographic range condition, said control sleeve in the normal range condition thereof being engageable with said stop surface to prevent axial movement of the cam tube for focusing of the optical system in the normal range, said cam sleeve in the macrophotographic range condition thereof being disposed out of engagement with said stop surface and disposed for camming engagement with said cam surface for effecting cammed axial movement of the cam tube in response to rotational movement of the rotatable one of the cam tube and the lens operating means thereby to alter the axial movement of the variator lens and the compensator lens for effecting focusing of the optical system in the macrophotographic range.

19. The optical system of claim 18, and further including bias means resiliently urging said control sleeve to the normal range condition thereof.

20. The optical system of claim 18, wherein said control sleeve has formed therein a first groove extending along a plane substantially normal to the optical system and defining said stop surface, and a second groove intersecting said first groove and defining said cam surface.

21. The optical system of claim 18, wherein the cam tube has an axial slot therein, said control sleeve having two radially extending pins thereon, one of said pins being engageable in said axial slot of the cam tube for coupling said control sleeve to the cam tube, the other of said pins being disposed for engagement with said stop surface and said cam surface.

22. In a variable focal length optical system including a variator lens and a compensator lens defining an optical axis and focusable within a normal range between a telephoto condition and a wide angle condition and being capable of close focusing in a macrophotographic range, the improvement comprising a cam tube having first cam means thereon and being disposed coaxially with the optical axis and rotatable with respect thereto, lens operating structure including support means and two lens holders respectively carrying the variator lens and the compensator lens and independently slidably movable on said support means axially with respect to the optical axis, each of said lens holders having second cam means thereon disposed in camming engagement with said first cam means and responsive to rotational movement of said cam tube for effecting coordinated cammed axial movements of the variator lens and the compensator lens with respect to said cam tube for focusing the optical system within the normal range, control means coupled to said cam tube and shiftable between a normal range condition and a macrophotographic range condition, said control means in the normal range condition thereof preventing axial movement of said cam tube, said control means in the macrophotographic range condition thereof effecting axial movement of said cam tube in response to rotational movement thereof thereby to alter the axial movement of the variator lens and the compensator lens for effecting focusing of the optical system in the macrophotographic range.

23. The optical system of claim 22, wherein said support means includes a plurality of equiangularly spaced apart rods extending parallel to the optical axis and fixed with respect thereto, each of said lens holders receiving said rods slidably therethrough, whereby said rods accommodates sliding axial movement of said lens holders while preventing rotational movement of said lens holders.

24. The optical system of claim 22, wherein said support means includes a generally cylindrical tube disposed coaxially with the optical axis and fixed with respect thereto, and having an elongated axial slot therein, each of said lens holders having a guide member slidably disposed in said axial slot for accommodating axial movement of said lens holders while preventing rotational movement thereof.

25. The optical system of claim 22, wherein said cam tube is disposed in surrounding relationship with said lens operating structure.

* * * * *